United States Patent [19]

Matsuoka et al.

[11] 4,013,592
[45] Mar. 22, 1977

[54] HIGH TEMPERATURE THERMISTOR COMPOSITION

[75] Inventors: Tomizo Matsuoka; Yoshihiro Matsuo, both of Neyagawa; Shigeru Hayakawa, Hirakata, all of Japan

[73] Assignee: Matsushita Electric Industrial Co., Ltd., Japan

[22] Filed: Feb. 17, 1976

[21] Appl. No.: 658,666

[30] Foreign Application Priority Data
Feb. 19, 1975 Japan .............................. 50-21201

[52] U.S. Cl. .............................. 252/521; 338/22 R
[51] Int. Cl.² .......................................... H01B 1/08
[58] Field of Search ......... 252/521, 62.3 V, 62.3 R; 338/22; 106/73.2, 73.4

[56] References Cited
OTHER PUBLICATIONS

Chemical Abstracts 81, 178868z, "Thermistor Materials for High Temperature use".
Chemical Abstracts 83, 52005p and 52006q, "Ceramic Thermistors for High-Temperature Applications.".

Primary Examiner—Leland A. Sebastian
Assistant Examiner—E. Suzanne Parr
Attorney, Agent, or Firm—Wenderoth, Lind & Ponack

[57] ABSTRACT

A high temperature thermistor composition comprising a spinel-type Mg Al$_2$O$_4$ and perovskite-type La CrO$_3$ or (La, Sr) CrO$_3$ is usable for the temperature range from 400° to 600° C, and a high temperature thermistor composition comprising spinel-type solid solution Mg(Al, Cr)$_2$O$_4$ and perovskite-type solid solution (La, Sr) CrO$_3$ or LaCrO$_3$ is usable for a higher temperature range up to 1000° C.

4 Claims, 2 Drawing Figures 4,013,592

HIGH TEMPERATURE THERMISTOR COMPOSITION

BACKGROUND OF THE INVENTION

This invention relates to compositions for thermistor, and more particularly to compositions for high temperature thermistors.

The conventional thermistors comprise, for example, cobalt oxide, manganese oxide, nickel oxide and/or iron oxide, and they have been usually employed at a temperature range from room temperature to about 300° C. Recently, a high temperature thermistor has been developed which is available for employment in a higher temperature range i.e. up to about 1000° C. For example, Japanese patent publication No. 41-15855/1966 discloses a high temperature thermistor consisting of $SnO_2$—$TiO_2$ solid solution as a principal component and as additives, at least one oxide selected from the group consisting of $Sb_2O_3$ and $Ta_2O_5$ in an amount of less than 5% by mole, which can be used at a high temperature up to 1000° C. It is also disclosed in Rev. of Scientific Inst., 40, pp544–549(1969) that a thermistor consisting of $ZrO_2$ as a principal component and an additive of $Y_2O_3$ is available for employment at a high temperature i.e. up to about 1000° C. Furthermore, U.S. Pat. No. 3,598,764 discloses a thermistor consisting of $CeO_2$ as a principal component and an additive of $ZrO_2$ in an amount of 2 to 15% by weight, which is available for employment at a high temperature i.e. up to 1000° C. However, these conventional high temperature thermistor compositions have some disadvantages such at time-dependent characteristics. Particularly, they show unstability when they are used at a high temperature under applied d.c. voltage.

Recently, a high temperature thermistor which can be used in a working temperature above 300° C has been intensively required. For example, a thermistor is desired which can be used as a sensor of a temperature controller in a thermal reactor where exhaust gas from a motor car engine is reburnt. In this case, this thermistor must operate steadily at a temperature range from 600° C to 1000° C, and in addition the high temperature thermistor is used under an application of d.c. voltage because a d.c. electrical battery used as an electric power source in a motor car.

SUMMARY OF THE INVENTION

Therefore, an object of the present invention is to provide a novel and improved high temperature thermistor composition.

Another object of the invention is to provide an improved high temperature thermistor having superior characteristics such as good reproducibility and small resistance deviation at a given high temperature under load aging with applied d.c. voltage, with various values of resistivities and B-values (defined hereinafter) at working temperature.

A further object of the invention is to provide two kinds of high temperature thermistor compositions which are suitable for use at a temperature range from 400° to 600° C and 600° to 1000° C, respectively.

These objects of the invention are achieved by providing a high temperature thermistor composition according to the present invention, which comprises 10 to 90 mole % of spinel-type $MgAl_2O_4$ and 10 to 90 mole % of perovskite-type $LaCrO_3$.

Especially, a thermistor suitable for use at a high temperature from 400° to 600° C is provided by a composition of spinel-type $MgAl_2O_4$ and perovskite-type $LaCrO_3$ or $(La, Sr)CrO_3$ solid solution, and a thermistor suitable for use at a higher temperature from 600° to 1000° C is provided by a composition of spinel-type solid solution $Mg(Al, Cr)_2O_4$ and perovskite-type $LaCrO_3$ or $(La, Sr)CrO_3$ solid solution.

These thermistors show good reproducibility, and small resistivity deviation even after use for a long time at working temperature under an application of d.c. voltage. The resistance and B-value at the working temperature of these thermistors can be changed widely by changing a molar ratio of spinel type and perovskite-type phases. For the thermistor for use at the 600° to 1000° C temperature range, these values can be changed further by changing the Al/Cr atomic ratio in spinel-type $Mg(Al, Cr)_2O_4$.

DETAILED DESCRIPTION OF THE INVENTION

A thermistor produced according to the invention is described with reference to FIG. 1.

Figure 1:
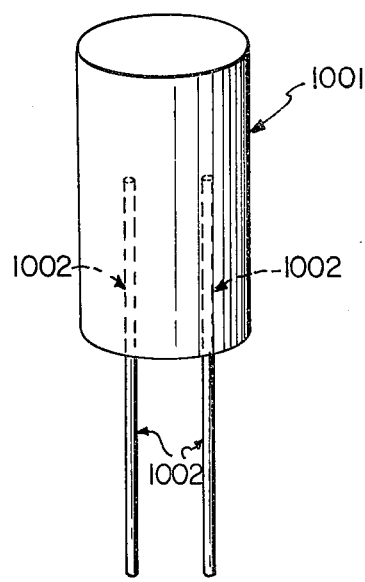

In FIG. 1, reference numeral 1001 designates a rod-type sintered body of a high temperature thermistor having a composition according to the invention. A pair of electrodes 1002 made of platinum is set, before sintering, into the pressed body by a pressing process.

It has been discovered according to the present invention that by using a sintered body comprising a spinel-type $Mg Al_2O_4$ and perovskite-type $LaCrO_4$ or $(La, Sr) CrO_4$ solid solutions, there is provided a high temperature thermistor available for use at a temperature range from 400° to 600° C with a high stability of electrical characteristics thereof in load aging under an application of a d.c. voltage. The preferred composition of this thermistor is formed from a secondary system of 10 to 90 mole percent of $MgAl_2O_4$ and 10 to 90 mole percent of $LaCrO_3$. In $LaCrO_3$, La ion can be substituted partially by Sr ion.

A spinel-type $MgAl_2O_4$ has a high resistivity, and perovskite-type $LaCrO_3$ has a low resistivity. Further, the latter has a small temperature coefficient of resistivity. However, it is found that the mixed ceramic body of these two components provides a high temperature thermistor with moderate resistivity and B-value at working temperature and furthermore with superior stability of electrical characteristics thereof in load aging under an application of d.c. voltage. Moreover, such a mixed ceramic thermistor of this secondary system has an advantage that the resistance and B-value can be desirably chosen for a working temperature by changing just a ratio of each component without changing the composition.

The high temperature thermistors according to the invention are prepared as follows. Starting ingredients of MgO, $Al_2O_3$, $La_2O_3$, $Cr_2O_3$ and $SrCO_3$ in appropriate proportion are intimately mixed in a ball mill with agate balls under alcohol. After mixing, the mixture is dried and then prefired at a temperature of 1100° C to 1400° C for 1 to 5 hours. The prefired mixture is then subjected to wet grinding in the ball mill for 10 to 24 hours, and dried. The pulverized prefired powder is then mixed with pure water by 6% in weight and granulated. After that, the powder is pressed into a rod form of 2mm in diameter and 4 mm in length with two platinum lead wires of 0.3 mm in diameter inserted into the rod-type powder compact as shown in FIG. 1. The platinum electrodes 1002 are set into the powder compact 2 mm in depth by a pressing process. Finally, the pressed rods with Pt lead wires are sintered at a temperature of 1500° to 1700° C in air for 1 to 5 hours.

For the obtained rod-type thermistors of the invention, electrical resistances were measured in a temperature range from 20° to 1000° C, and B-values were calculated from a following equation:

$$\frac{R_1}{R_2} = \exp\left(\frac{B}{T_1} - \frac{B}{T_2}\right)$$

where $R_1$ and $R_2$ are electrical resistances at temperatures of $T_1°$ K and $T_2°$ K, respectively, and $B$ is a constant, that is so-called B-value of a thermistor. Furthermore, aging tests of electrical resistance were carried out as it is one of important factors for a practical use. Resistance deviation in an aging test is defined by a term of $(R_t-R_0/R_0) \times 100$ (%), where $R_0$ is an initial resistance in an aging test and $Rt$ is a resistance after a lapse of time $t$, and the electrical resistance was measured at 500° C under a continuous application of d.c. voltage of 6V.

Table 1 shows the various compositions of the high temperature thermistor which is available for use at 400° to 600° C temperature range and the results of their measured electrical characterics and the load aging test of 1000 hours under applied d.c. voltage of 6V. For samples No. 1 to No. 13, these results are shown for various molar ratios of spinel-type $MgAl_2O_4$ and perovskite-type $LaCrO_3$. As understood from Table 1, the electrical resistance and B-value at working temperature decrease in accordance with increase of a molar ratio of $LaCrO_3$. It is an advantage of this invention that under practical conditions of use, the resistance and B-value can be changed by changing the molar ratio of spinel-type and perovskite-type components, as described hereinbefore.

For the aging test under continuously applied d.c. voltage of 6V for 1000 hours, it is desirable for practical use that the resistance deviation be within 10%. Such a small deviation is realized by the compositions having more than 10 mole % of $LaCrO_3$. On the other hand, for the composition of 100 mole % of $LaCrO_3$, the B-value is too small for practical use. Therefore, the desirable composition of a high temperature thermistor suitable for 400° to 600° C is limited to 10 to 90 mole % of $MgAl_2O_4$ and 10 to 90 mole % of $LaCrO_3$.

Furthermore, samples No. 14 to No. 20 in Table 1 show the effect of Sr substitution for La ion in $LaCrO_3$ in a case of a principal composition of 0.80 $MgAl_2O_4$+0.20 $LaCrO_3$. By this Sr substitution by amount from 5 to 20 atom % for La ion, load aging characteristics are intensively improved as shown in Table 1. The most effective results are provided at Sr substitution of 16 atom %. For the compositions of the samples No. 2 to No. 13 in Table 1, La ion is substituted by 16 atom % of Sr ion as in samples No. 22 to No. 33, and the same aging test was carried out. The results of the aging test are shown in Table 2. By these results of Sr substitution for La ion, it is understood that the aging test characteristics of any principal compositions are intensively improved, although the other electrical characteristics are not so much improved.

For a thermistor composition of the invention for higher working temperature ranging from 600° to 1000° C, a ternary system composition $MgAl_2O_4$—$MgCr_2O_4$—$LaCrO_3$ is available. Various compositions of this ternary system are shown in Table 3. It was found by X-ray analysis that $MgAl_2O_4$ and $MgCr_2O_4$ actually formed a solid solution $Mg(Al, Cr)_2O_4$ in a ceramic body. Therefore, this ternary system can be expressed by the $(1-Z)Mg(Al_{1-x}, Cr_x)_2O_4$—$ZLaCrO_3$ system. The manufacturing process for this thermistor is quite the same as that described hereinbefore for the high temperature thermistor used at a working temperature range of 400° to 600° C. The electrical characteristics were also measured in the same manner as that described hereinbefore. But load aging test was carried out at 800° C under a continuously applied d.c. voltage of 6V. The results of the measured electric characteristics and aging test are summarized in Table 4.

Figure 2:
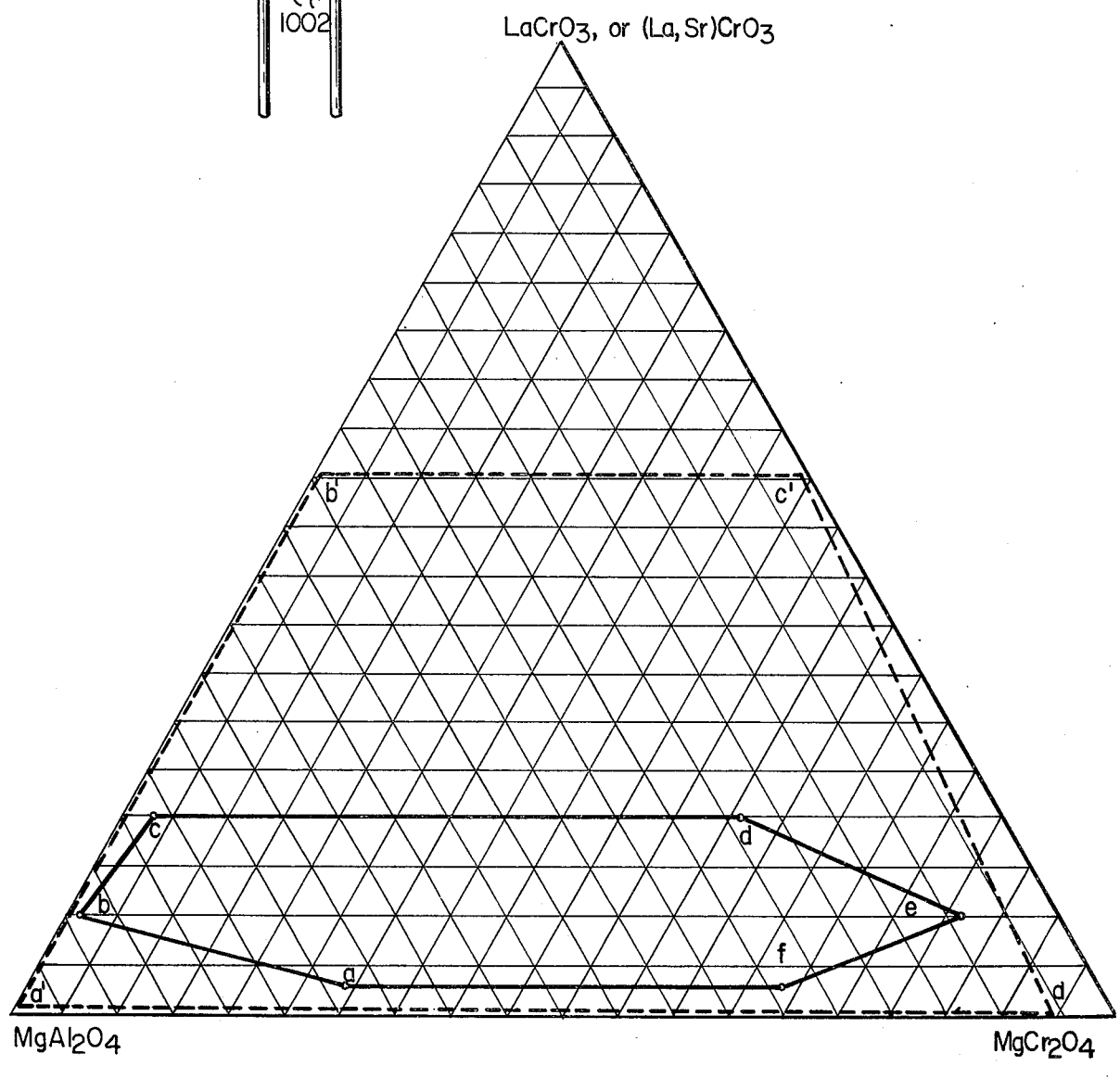

From Table 3, it is understood that the resistance and B-value at working temperature range can be widely changed according to atomic ratio of Al to Cr in spinel-type $Mg(Al, Cr)_2O_4$ and molar ratio of spinel-type $Mg(Al, Cr)_2O_4$ to perovskite-type $LaCrO_3$. This is an advantage of this invention. As a rule, the resistance and B-value increase in accordance with increase of atomic ratio of Al to Cr in $Mg(Al, Cr)_2O_4$ and molar ratio of $Mg(Al, Cr)_2O_4$ to $LaCrO_3$. The resistance deviation at 800° C after 1000 hours under continuously applied d.c. voltage by 6V should be within 10% for a practical use. As shown in Table 4, the resistance deviation within 10% is satisfactorily realized by the composition of $(1-Z)Mg(Al_{1-x}Cr_x)_2O_4$—$ZLaCrO_3$ system; wherein $0.3 \leq x \leq 0.7$ at $Z=0.03$
$0.01 \leq x \leq 0.9$ at $Z=0.10$
$0.03 \leq x \leq 0.7$ at $Z=0.20$ This composition area is expressed in FIG. 2 as the area enclosed by six points $a$, $b$, $c$, $d$, $e$, and $f$ in the ternary system $A.MgAl_2O_4$—$B.MgCr_2O_4$—$C.LaCrO_3$. In this case, the coordinates of these six points are calculated as follows:

| | | | |
|---|---|---|---|
| (a) | A=0.679 | B=0.291 | C=0.03 |
| (b) | A=0.891 | B=0.009 | C=0.10 |
| (c) | A=0.776 | B=0.024 | C=0.20 |
| (d) | A=0.24 | B=0.56 | C=0.20 |
| (e) | A=0.09 | B=0.81 | C=0.10 |
| (f) | A=0.291 | B=0.679 | C=0.03. |

Furthermore, Sr substitution for La ion in $LaCrO_3$ is also found effective to improve the load aging characteristics, similarly to the former case. Table 5 shows the results of the measured electrical characteristics and aging test for Sr substitution for La ion in composition of 0.99Mg $(Al_{0.7}Cr_{0.3})_2O_4$+0.01$(La_{1-y}Sr_y)CrO_3$, as an example. As shown in Table 5, the results of the aging test are intensively improved, especially in case of Sr substituion by 5 to 20 atom % for La ion in $LaCrO_3$. Table 4 also shows an effect of Sr substitution for other compositions of different molar ratio of $Mg(Al, Cr)_2O_4$ to $LaCrO_3$, as a case of Sr substitution by 16 atom. % for La ion. In Table 4, notations of A, B, C and D are used as terms of appraisal for the load aging test characteristics as follows:

A: under 5% resistance deviation after 1000 hours
B: under 10% resistance deviation after 1000 hours
C: under 30% resistance deviation after 1000 hours
D: above 30% resistance deviation after 1000 hours.

It is found that even the compositions designated by C have small resistance deviation after 1000 hours when the load aging test is carried out at a rather lower temperature as from 400° to 600° C. For instances, the samples No. 43, 44, 51 and 92 showed a resistance deviation within 10% when they were subjected to a temperature of 500° C for 1000 hours under continuously applied d.c. voltage of 6V. The compositions designated by A are preferred compositions for a high temperature thermistor up to 1000° C, as they showed a resistance deviation within 10% after load aging test at 1000° C for 1000 hours under continuously applied d.c. voltage of 6V.

From these results, the thermistor compositions appropriate to a high temperature thermistors to be used above 400° C are comprehensively obtained by a composition of the $(1-Z)Mg(Al_{1-x}Cr_x)_2O_4—Z(La_{1-y}Sr_y)CrO_3$ system, wherein $Z=0.45\sim0.995$, $x=0.001\sim0.95$, and $y=0.05\sim0.20$. This composition is expressed in FIG. 2 as the area enclosed by a dotted line with four points $a'$, $b'$, $c'$ and $d'$ in ternary system $MgAl_2O_4—MgCr_2O_4—LaCrO_3$. The coordinates of these four points are calculated as follows:

| | | | |
|---|---|---|---|
| (a') | A=0.994 | B=0.001 | C=0.005 |
| (b') | A=0.4495 | B=0.0005 | C=0.55 |
| (c') | A=0.0225 | B=0.4275 | C=0.55 |
| (d') | A=0.050 | B=0.945 | C=0.005 |

Table 3

| Sample No. | Composition |
|---|---|
| 41 | $Mg(Al_{0.7}Cr_{0.3})_2O_4$ |
| 42 | $Mg(Al_{0.3}Cr_{0.7})_2O_4$ |
| 43 | $0.995Mg(Al_{0.7}Cr_{0.3})_2O_4+0.005LaCrO_3$ |
| 44 | $0.995Mg(Al_{0.3}Cr_{0.7})_2O_4+0.005LaCrO_3$ |
| 45 | $0.99Mg(Al_{0.999}Cr_{0.001})_2O_4+0.01LaCrO_3$ |
| 46 | $0.99Mg(Al_{0.99}Cr_{0.01})_2O_4+0.01LaCrO_3$ |
| 47 | $0.99Mg(Al_{0.9}Cr_{0.1})_2O_4+0.01LaCrO_3$ |
| 48 | $0.99Mg(Al_{0.7}Cr_{0.3})_2O_4+0.01LaCrO_3$ |
| 49 | $0.99Mg(Al_{0.3}Cr_{0.7})_2O_4+0.01LaCrO_3$ |
| 50 | $0.99Mg(Al_{0.1}Cr_{0.9})_2O_4+0.01LaCrO_3$ |
| 51 | $0.99Mg(Al_{0.05}Cr_{0.95})_2O_4+0.01LaCrO_3$ |
| 52 | $0.97Mg(Al_{0.999}Cr_{0.001})_2O_4+0.03LaCrO_3$ |
| 53 | $0.97Mg(Al_{0.99}Cr_{0.01})_2O_4+0.03LaCrO_3$ |
| 54 | $0.97Mg(Al_{0.97}Cr_{0.03})_2O_4+0.03LaCrO_3$ |
| 55 | $0.97Mg(Al_{0.9}Cr_{0.1})_2O_4+0.03LaCrO_3$ |
| 56 | $0.97Mg(Al_{0.7}Cr_{0.3})_2O_4+0.03LaCrO_3$ |
| 57 | $0.97Mg(Al_{0.3}Cr_{0.7})_2O_4+0.03LaCrO_3$ |
| 58 | $0.97Mg(Al_{0.1}Cr_{0.9})_2O_4+0.03LaCrO_3$ |
| 59 | $0.97Mg(Al_{0.05}Cr_{0.95})_2O_4+0.03LaCrO_3$ |
| 60 | $0.9MgAl_2O_4+0.1LaCrO_3$ |
| 61 | $0.9Mg(Al_{0.999}Cr_{0.001})_2O_4+0.1LaCrO_3$ |
| 62 | $0.9Mg(Al_{0.997}Cr_{0.003})_2O_4+0.1LaCrO_3$ |
| 63 | $0.9Mg(Al_{0.99}Cr_{0.01})_2O_4+0.1LaCrO_3$ |
| 64 | $0.9Mg(Al_{0.97}Cr_{0.03})_2O_4+0.1LaCrO_3$ |
| 65 | $0.9Mg(Al_{0.9}Cr_{0.1})_2O_4+0.1LaCrO_3$ |
| 66 | $0.9Mg(Al_{0.8}Cr_{0.2})_2O_4+0.1LaCrO_3$ |
| 67 | $0.9Mg(Al_{0.7}Cr_{0.3})_2O_4+0.1LaCrO_3$ |
| 68 | $0.9Mg(Al_{0.6}Cr_{0.4})_2O_4+0.1LaCrO_3$ |
| 69 | $0.9Mg(Al_{0.5}Cr_{0.5})_2O_4+0.1LaCrO_3$ |
| 70 | $0.9Mg(Al_{0.3}Cr_{0.7})_2O_4+0.1LaCrO_3$ |
| 71 | $0.9Mg(Al_{0.1}Cr_{0.9})_2O_4+0.1LaCrO_3$ |
| 72 | $0.9Mg(Al_{0.05}Cr_{0.95})_2O_4+0.1LaCrO_3$ |
| 73 | $0.9Mg(Al_{0.01}Cr_{0.99})_2O_4+0.1LaCrO_3$ |
| 74 | $0.8Mg(Al_{0.999}Cr_{0.001})_2O_4+0.2LaCrO_3$ |
| 75 | $0.8Mg(Al_{0.99}Cr_{0.01})_2O_4+0.2LaCrO_3$ |
| 76 | $0.8Mg(Al_{0.97}Cr_{0.03})_2O_4+0.2LaCrO_3$ |
| 77 | $0.8Mg(Al_{0.9}Cr_{0.1})_2O_4+0.2LaCrO_3$ |

Table 1

| Sample No. | Composition | Resistance at 400° C | Resistance at 800° C | B.value | Resistance Deviation $\frac{R_1 - R_0}{R_0} \times 100$ (%) at 500° C after 1000 hours |
|---|---|---|---|---|---|
| 1 | $MgAl_2O_4$ | $4.2\times10^{12}$ | $1.0\times10^8$ | 19200 | 50 |
| 2 | $0.98MgAl_2O_4+0.02LaCrO_3$ | $3.4\times10^{11}$ | $4.5\times10^7$ | 16100 | 49 |
| 3 | $0.95MgAl_2O_4+0.05LaCrO_3$ | $8.8\times10^{10}$ | $1.25\times10^7$ | 16000 | 41 |
| 4 | $0.90MgAl_2O_4+0.10LaCrO_3$ | $1.2\times10^{10}$ | $1.9\times10^6$ | 15800 | 9.5 |
| 5 | $0.80MgAl_2O_4+0.20LaCrO_3$ | $5.6\times10^7$ | $1.2\times10^4$ | 12300 | 8.0 |
| 6 | $0.70MgAl_2O_4+0.30LaCrO_3$ | $7.3\times10^6$ | $1.96\times10^4$ | 10700 | 7.4 |
| 7 | $0.60MgAl_2O_4+0.40LaCrO_3$ | $9.3\times10^5$ | $6.0\times10^3$ | 9100 | 7.0 |
| 8 | $0.50MgAl_2O_4+0.50LaCrO_3$ | $2.9\times10^5$ | $3.3\times10^3$ | 8090 | 6.3 |
| 9 | $0.40MgAl_2O_4+0.60LaCrO_3$ | $6.5\times10^4$ | $1.0\times10^3$ | 7520 | 6.2 |
| 10 | $0.30MgAl_2O_4+0.70LaCrO_3$ | $6.4\times10^3$ | $1.4\times10^2$ | 4150 | 5.2 |
| 11 | $0.20MgAl_2O_4+0.80LaCrO_3$ | $5.7\times10^2$ | $1.65\times10^2$ | 2240 | 5.0 |
| 12 | $0.10MgAl_2O_4+0.90LaCrO_3$ | $3.1\times10^1$ | $1.7\times10^1$ | 1050 | 4.8 |
| 13 | $LaCrO_3$ | $3.3\times10^0$ | $2.47\times10^0$ | 520 | 4.0 |
| 14 | $0.80MgAl_2O_4+0.2(La_{0.99}Sr_{0.01})CrO_3$ | $5.5\times10^7$ | $1.3\times10^4$ | 12200 | 8.0 |
| 15 | $0.80MgAl_2O_4+0.2(La_{0.98}Sr_{0.02})CrO_3$ | $5.3\times10^7$ | $6.1\times10^4$ | 12200 | 7.9 |
| 16 | $0.80MgAl_2O_4+0.2(La_{0.95}Sr_{0.05})CrO_3$ | $5.3\times10^7$ | $6.5\times10^4$ | 12100 | 4.5 |
| 17 | $0.80MgAl_2O_4+0.2(La_{0.90}Sr_{0.10})CrO_3$ | $5.1\times10^7$ | $6.6\times10^4$ | 12000 | 4.3 |
| 18 | $0.80MgAl_2O_4+0.2(La_{0.84}Sr_{0.16})CrO_3$ | $5.0\times10^7$ | $7.2\times10^4$ | 11800 | 2.8 |
| 19 | $0.80MgAl_2O_4+0.2(La_{0.80}Sr_{0.20})CrO_3$ | $5.7\times10^7$ | $6.2\times10^4$ | 12300 | 3.6 |
| 20 | $0.80MgAl_2O_4+0.2(La_{0.75}Sr_{0.25})CrO_3$ | $6.0\times10^7$ | $5.9\times10^4$ | 12500 | 15 |

Table 2

| Sample No. | Composition | Resistance Deviation $\frac{R_1 - R_0}{R_0} \times 100$ (%) at 500° C after 1000 hours, 16 atom % $Sr_{Substitution}$ |
|---|---|---|
| 22 | $0.98MgAl_2O_4+0.02(La_{0.84}Sr_{0.16})CrO_3$ | 22 |
| 23 | $0.95MgAl_2O_4+0.05(La_{0.84}Sr_{0.16})CrO_3$ | 15 |
| 24 | $0.90MgAl_2O_4+0.10(La_{0.84}Sr_{0.16})CrO_3$ | 4.4 |
| 25 | $0.80MgAl_2O_4+0.20(La_{0.84}Sr_{0.16})CrO_3$ | 2.8 |
| 26 | $0.70MgAl_2O_4+0.30(La_{0.84}Sr_{0.16})CrO_3$ | 2.7 |
| 27 | $0.60MgAl_2O_4+0.40(La_{0.84}Sr_{0.16})CrO_3$ | 2.7 |
| 28 | $0.50MgAl_2O_4+0.50(La_{0.84}Sr_{0.16})CrO_3$ | 2.5 |
| 29 | $0.40MgAl_2O_4+0.60(La_{0.84}Sr_{0.16})CrO_3$ | 2.4 |
| 30 | $0.30MgAl_2O_4+0.70(La_{0.84}Sr_{0.16})CrO_3$ | 2.4 |
| 31 | $0.20MgAl_2O_4+0.80(La_{0.84}Sr_{0.16})CrO_3$ | 2.2 |
| 32 | $0.10MgAl_2O_4+0.90(La_{0.84}Sr_{0.16})CrO_3$ | 2.1 |
| 33 | $(La_{0.84}Sr_{0.16})CrO_3$ | 1.9 |

Table 3-continued

| Sample No. | Composition |
|---|---|
| 78 | $0.8Mg(Al_{0.7}Cr_{0.3})_2O_4+0.2LaCrO_3$ |
| 79 | $0.8Mg(Al_{0.3}Cr_{0.7})_2O_4+0.2LaCrO_3$ |
| 80 | $0.8Mg(Al_{0.1}Cr_{0.9})_2O_4+0.2LaCrO_3$ |
| 81 | $0.8Mg(Al_{0.05}Cr_{0.95})_2O_4+0.2LaCrO_3$ |
| 82 | $0.7Mg(Al_{0.999}Cr_{0.001})_2O_4+0.3LaCrO_3$ |
| 83 | $0.7Mg(Al_{0.99}Cr_{0.01})_2O_4+0.3LaCrO_3$ |
| 84 | $0.7Mg(Al_{0.97}Cr_{0.03})_2O_4+0.3LaCrO_3$ |
| 85 | $0.7Mg(Al_{0.9}Cr_{0.1})_2O_4+0.3LaCrO_3$ |
| 86 | $0.7Mg(Al_{0.7}Cr_{0.3})_2O_4+0.3LaCrO_3$ |
| 87 | $0.7Mg(Al_{0.3}Cr_{0.7})_2O_4+0.3LaCrO_3$ |
| 88 | $0.7Mg(Al_{0.1}Cr_{0.9})_2O_4+0.3LaCrO_3$ |
| 89 | $0.7Mg(Al_{0.05}Cr_{0.95})_2O_4+0.3LaCrO_3$ |
| 90 | $0.6Mg(Al_{0.7}Cr_{0.3})_2O_4+0.4LaCrO_3$ |
| 91 | $0.6Mg(Al_{0.3}Cr_{0.7})_2O_4+0.4LaCrO_3$ |
| 92 | $0.45Mg(Al_{0.999}Cr_{0.001})_2O_4+0.55LaCrO_3$ |
| 93 | $0.45Mg(Al_{0.99}Cr_{0.01})_2O_4+0.55LaCrO_3$ |
| 94 | $0.45Mg(Al_{0.9}Cr_{0.1})_2O_4+0.55LaCrO_3$ |
| 95 | $0.45Mg(Al_{0.7}Cr_{0.3})_2O_4+0.55LaCrO_3$ |
| 96 | $0.45Mg(Al_{0.3}Cr_{0.7})_2O_4+0.55LaCrO_3$ |
| 97 | $0.4Mg(Al_{0.7}Cr_{0.3})_2O_4+0.6LaCrO_3$ |
| 98 | $0.4Mg(Al_{0.3}Cr_{0.7})_2O_4+0.6LaCrO_3$ |

Table 4

| Sample No. | Resistance ($\Omega$) Temperature at 400°C | Resistance ($\Omega$) Temperature at 800°C | B-value | Resistance Deviation after 1000 hrs. at 800°C (%) $\frac{R_1 - R_0}{R_0} \times 100$ (%) | Resistance Deviation after 1000 hrs. at 800°C 16 atom. % Sr Substitution | Appraisal |
|---|---|---|---|---|---|---|
| 41 | $1.0\times10^7$ | $3.4\times10^4$ | 10300 | 510 | 150 | D |
| 42 | $6.8\times10^3$ | $2.2\times10^2$ | 6190 | 870 | 330 | D |
| 43 | $3.0\times10^6$ | $1.3\times10^4$ | 9820 | 98 | 30 | C |
| 44 | $3.4\times10^3$ | $1.2\times10^2$ | 6040 | 105 | 29 | C |
| 45 | $3.7\times10^{10}$ | $4.6\times10^6$ | 16200 | 100 | 21 | C |
| 46 | $1.8\times10^9$ | $1.2\times10^6$ | 13200 | 95 | 19 | C |
| 47 | $1.7\times10^8$ | $3.4\times10^5$ | 11200 | 71 | 17 | C |
| 48 | $8.0\times10^5$ | $4.9\times10^3$ | 9200 | 29 | 8.4 | B |
| 49 | $2.3\times10^3$ | $9.0\times10$ | 5850 | 44 | 9.0 | B |
| 50 | $9.4\times10$ | $1.4\times10$ | 3440 | 78 | 16 | C |
| 51 | $3.9\times10$ | 8.2 | 2820 | 105 | 28 | C |
| 52 | $1.4\times10^{10}$ | $2.4\times10^6$ | 15700 | 24 | 7.1 | B |
| 53 | $7.7\times10^8$ | $6.4\times10^5$ | 12800 | 13 | 4.5 | A |
| 54 | $1.9\times10^8$ | $3.3\times10^5$ | 11500 | 4.6 | 2.0 | A |
| 55 | $5.7\times10^7$ | $1.6\times10^5$ | 10600 | 4.1 | 2.0 | A |
| 56 | $1.4\times10^5$ | $1.9\times10^3$ | 7760 | 3.8 | 1.8 | A |
| 57 | $1.9\times10^3$ | $7.2\times10$ | 5910 | 4.4 | 2.1 | A |
| 58 | $6.4\times10$ | $1.0\times10$ | 3350 | 11 | 3.3 | A |
| 59 | $3.2\times10$ | 7.6 | 2600 | 26 | 5.9 | B |
| 60 | $1.2\times10^{10}$ | $1.9\times10^6$ | 15800 | 250 | 7.7 | D |
| 61 | $4.5\times10^9$ | $1.1\times10^6$ | 15000 | 29 | 6.9 | B |
| 62 | $1.4\times10^9$ | $6.8\times10^5$ | 13800 | 18 | 5.1 | B |
| 63 | $3.7\times10^8$ | $3.6\times10^5$ | 12500 | 7 | 3.0 | A |
| 64 | $1.5\times10^8$ | $2.0\times10^5$ | 12000 | 3.9 | 1.8 | A |
| 65 | $5.1\times10^7$ | $8.9\times10^4$ | 11500 | 2.5 | 1.5 | A |
| 66 | $1.9\times10^6$ | $8.6\times10^3$ | 9740 | 1.6 | 1.2 | A |
| 67 | $2.7\times10^5$ | $2.2\times10^3$ | 8680 | 0.4 | 0.2 | A |
| 68 | $5.4\times10^4$ | $6.6\times10^2$ | 7950 | 1.7 | 1.1 | A |
| 69 | $1.4\times10^4$ | $2.3\times10^2$ | 7420 | 3.2 | 1.9 | A |
| 70 | $1.8\times10^3$ | $5.9\times10$ | 6170 | 4.3 | 2.5 | A |
| 71 | $7.2\times10$ | $1.1\times10$ | 3390 | 8 | 3.6 | A |
| 72 | $3.6\times10$ | 7.8 | 2760 | 19 | 4.1 | A |
| 73 | $2.2\times10$ | 6.3 | 2260 | 190 | 43 | D |
| 74 | $3.2\times10^7$ | $7.1\times10^4$ | 11000 | 30 | 10 | B |
| 75 | $1.8\times10^7$ | $5.9\times10^4$ | 10300 | 14 | 5.1 | B |
| 76 | $7.0\times10^6$ | $3.7\times10^4$ | 9460 | 4.6 | 2.0 | A |
| 77 | $1.9\times10^6$ | $1.8\times10^4$ | 8410 | 3.3 | 1.8 | A |
| 78 | $5.1\times10^4$ | $9.4\times10^2$ | 7210 | 2.5 | 1.8 | A |
| 79 | $2.2\times10^2$ | $2.7\times10$ | 3790 | 3.9 | 2.0 | A |
| 80 | $4.7\times10$ | 8.0 | 3200 | 11 | 3.4 | A |
| 81 | $2.6\times10$ | 6.2 | 2590 | 27 | 7.3 | B |
| 82 | $1.3\times10^6$ | $9.0\times10^3$ | 8980 | 70 | 17 | C |
| 83 | $1.7\times10^6$ | $1.7\times10^4$ | 8310 | 56 | 11 | C |
| 84 | $7.8\times10^5$ | $8.6\times10^3$ | 8140 | 40 | 9.0 | B |
| 85 | $2.1\times10^5$ | $4.2\times10^3$ | 7060 | 28 | 7.5 | B |
| 86 | $1.2\times10^4$ | $5.0\times10^2$ | 5740 | 21 | 6.2 | B |
| 87 | $6.0\times10$ | $1.1\times10$ | 3060 | 46 | 9.1 | B |
| 88 | $3.2\times10$ | 6.0 | 3020 | 58 | 9.2 | B |
| 89 | $2.1\times10$ | 5.6 | 2390 | 73 | 21 | C |
| 90 | $3.1\times10^3$ | $2.8\times10^2$ | 4340 | 56 | 15 | C |
| 91 | $2.5\times10$ | 5.4 | 2770 | 63 | 17 | C |
| 92 | $3.4\times10^4$ | $6.2\times10^2$ | 7230 | 88 | 24 | C |
| 93 | $6.0\times10^4$ | $2.3\times10^3$ | 5890 | 77 | 20 | C |
| 94 | $1.2\times10^4$ | $5.3\times10^2$ | 5630 | 67 | 20 | C |
| 95 | $1.6\times10^3$ | $2.0\times10^2$ | 3750 | 59 | 19 | C |
| 96 | $1.7\times10$ | 4.3 | 2480 | 65 | 21 | C |
| 97 | $7.8\times10^2$ | $1.3\times10^2$ | 3230 | 130 | 45 | D |
| 98 | $1.0\times10$ | 3.7 | 1800 | 205 | 63 | D |

Table 5

| Y | 0 | 0.01 | 0.02 | 0.05 | 0.08 | 0.12 | 0.16 | 0.20 | 0.25 | 0.30 |
|---|---|---|---|---|---|---|---|---|---|---|
| Characteristics Resistance at 400°C | $2.3\times10^3$ | $2.3\times10^3$ | $2.2\times10^3$ | $2.1\times10^2$ | $2.0\times10^3$ | $1.8\times10^3$ | $1.7\times10^3$ | $2.1\times10^3$ | $6.9\times10^3$ | $4.0\times10^3$ |

Table 5-continued

| Resistance at 800° C | 9.0×10 | 8.9×10 | 8.7×10 | 8.4×10 | 8.1×10 | 7.4×10 | 6.9×10 | 8.3×10 | 2.2×10$^2$ | 6.2×10$^2$ |
|---|---|---|---|---|---|---|---|---|---|---|
| B-value | 5850 | 5840 | 5830 | 5800 | 5780 | 5760 | 5760 | 5810 | 6210 | 7500 |
| Resistance Duration after 1000 hrs. | 44 | 44 | 39 | 22 | 14 | 12 | 9.0 | 15 | 79 | 185 |

What is claimed is:

1. A high temperature thermistor composition comprising 10 to 90 mole % of spinel-type $MgAl_2O_4$ and 10 to 90 mole % of perovskite-type $LaCrO_3$.

2. A high temperature thermistor composition according to claim 1, wherein La ion in said $LaCrO_3$ is substituted partially by 5 to 20 atom. % of Sr ion.

3. A high temperature thermistor composition having the ternary system $A.MgAl_2O_4$—$B.MgCr_2O_4$—$C.LaCrO_3$, wherein said composition is defined by the area of FIG. 2 enclosed by following six composition points;

| (a) | A=0.679 | B=0.291 | C=0.03 |
|---|---|---|---|
| (b) | A=0.891 | B=0.009 | C=0.10 |
| (c) | A=0.776 | B=0.024 | C=0.20 |
| (d) | A=0.24 | B=0.56 | C=0.20 |
| (e) | A=0.09 | B=0.81 | C=0.10 |
| (f) | A=0.291 | B=0.679 | C=0.03. |

4. A high temperature thermistor composition having the ternary system $A.MgAl_2O_4$—$B.MgCr_2O_4$—$C.(La_{1-y}Sr_y)CrO_3$, wherein $y$ is defined as $0.05 \leq y \leq 0.2$, wherein said composition is defined by the area of FIG. 2 enclosed by following four composition points;

| (a') | A=0.994 | B=0.001 | C=0.005 |
|---|---|---|---|
| (b') | A=0.4495 | B=0.0005 | C=0.55 |
| (c') | A=0.0225 | B=0.4275 | C=0.55 |
| (d') | A=0.050 | B=0.945 | C=0.005. |

* * * * *